United States Patent [19]

Kametani et al.

[11] Patent Number: 4,803,613
[45] Date of Patent: Feb. 7, 1989

[54] DECENTRALIZED MASTER-SLAVE CONTROL APPARATUS

[75] Inventors: Masatsugu Kametani, Ibaraki; Kengo Sugiyama, Abiko; Takashi Kogawa, Sakura; Takeshi Hanada, Chiba; all of Japan

[73] Assignee: Hitachi, Ltd., Tokyo, Japan

[21] Appl. No.: 860,430

[22] Filed: May 7, 1986

[30] Foreign Application Priority Data

May 10, 1985 [JP] Japan .................. 60-97701

[51] Int. Cl.$^4$ ...................... G06F 15/46; G06F 15/16; G06F 9/40
[52] U.S. Cl. ..................................... 364/132; 364/200
[58] Field of Search ............... 364/132, 131, 133, 134, 364/135, 138, 139, 200 MS File

[56] References Cited

U.S. PATENT DOCUMENTS

| | | | |
|---|---|---|---|
| 3,363,234 | 1/1968 | Erickson et al. | 364/200 |
| 4,123,794 | 10/1978 | Matsumoto | 364/200 |
| 4,251,858 | 2/1981 | Cambigue et al. | 364/132 |
| 4,302,818 | 11/1981 | Niemann | 364/736 |
| 4,347,564 | 8/1982 | Sugano et al. | 364/132 |
| 4,365,297 | 12/1982 | Grisham, Jr. | 364/200 |
| 4,380,698 | 4/1983 | Butts | 364/132 X |
| 4,432,064 | 2/1984 | Barker et al. | 364/132 |
| 4,459,655 | 2/1984 | Willemin | 364/132 |
| 4,497,019 | 1/1985 | Waber | 364/132 |

OTHER PUBLICATIONS

Hopkins-"An Improved Controller for the Rhino Robot Arm"-Conf. Proc. IEEE Southeastcon 1985, Raleigh, N.C. (Mar. 31-Apr. 3, 1985) pp. 333-337.
Lovetri-"DNC Plus . . . An Inroad to Plantwide Control at General Electric"-proceedings of the 20th Annual Meeting and Technical Conference, Numerical Control Society, Cincinnati, Ohio, Apr. 10-13, 1983, pp. 62-69.
Mercer et al.-"Serial Interface Stars in Robotic Station"-Electronic Design, vol. 31, No. 10, May 1983, pp. 177-182.
Costrell-"Fastbus Modular High Speed Data Acquisition System"-Conference Record, IEEE International Conference on Communications, Philadelphia, Pa., Jun. 13-17, 1982-vol. 3, pp. 5c.4.1-5c.4.5.
Hennet et al-"Programmable Interrupt Vectors in Processors"-IBM Tech. Disc. Bulletin, vol. 25, No. 5, Oct. 1982, pp. 2641, 2642.
Taylor et al-"An Integrated Robot System Architecture"-Proc. of the IEEE-vol. 71, No. 7, Jul. 1983-pp. 842-856.

Primary Examiner—Joseph Ruggiero
Attorney, Agent, or Firm—Antonelli, Terry & Wands

[57] ABSTRACT

A control apparatus for controlling a controlled object including controlled elements comprises a host processor, a plurality of slave modules and a communication network for providing communication between the host processor and the slave modules. The host processor interprets a control program to generate commands for the controlled elements in response to demands send from the slave modules. These commands are sent via the communication network to the respective slave modules. Each slave module is allotted to a controlled element and has a processor which interprets and executes the commands for its allotted controlled element and generates a demand upon finishing the execution of a command. This demand is sent via the communication network to the host processor and causes the next command to be generated.

20 Claims, 10 Drawing Sheets

DECENTRALIZED MASTER-SLAVE CONTROL APPARATUS

BACKGROUND OF THE INVENTION

The present invention relates to an automatic control apparatus and more particularly to a general-purpose control apparatus for the control of a variety of kinds of equipment including those which require a high-level control function such as an adaptive control type robot.

So far, control devices for robots, machine tools and other factory equipment have in many cases been designed and manufactured as special-purpose control units dedicated to the control of a single predetermined controlled object. A special-purpose control device having an architecture directed to controlling a single object shows a high cost performance so long as it controls its intended object in a predetermined mode. However, it lacks adaptability to meet changes in the controlled object and the required control function. That is, when an existing control device has to be applied to another controlled object of the same kind but having a higher-level performance or function, or to an object of a different kind, or when an increase in the number of controlled objects, the introduction of a higher-level control function (for example, adaptive control or coordinate control), or an improvement in the speed or accuracy of control is required, it becomes necessary to alter the hardware of the device to a large extent. Moreover, in many cases, a partial change of the hardware can not provide the required control that the entire device must be replaced. In this connection, K. Aizawa et al. disclose, in their paper entitled "Development of New Type Robot Control Console (Model 4)" (The TOKICO REVIEW, Vol. 28, No. 1, pp. 20–26, 1984), a new type robot control console developed to cope with the development of various types of robots and the requirements for more sophisticated organic interfaces with peripheral devices, stating that the old type control consoles will not be able to meet such higher-level control functions. Accordingly, in the long-term view, it should be said that the cost performance of the special-purpose control device is rather low.

As a general-purpose control apparatus, a minicomputer or a super-minicomputer has hitherto been widely used, but such a computer is not satisfactory in that the processor load increases rapidly as the number of controlled objects increases, resulting in an overflow of its processing capacity. Further, the real-time processing and sensor-base adaptive control capacities are limited, and each computers are costly.

SUMMARY OF THE INVENTION

An object of the present invention is to provide a general-purpose control apparatus which has flexibility and expansibility of a high degree.

Another object of the present invention is to provide a hierarchical multiple controller system which has flexibility and expansibility of a high degree.

Still another object of the present invention is to provide a control apparatus which is provided with a plurality of intelligent slave modules and a host processor for supervising the plane modules wherein the alteration of the functions, replacement, and increase and decrease of the number of the slave modules are facilitated.

A further object of the present invention is to provide a decentralized control apparatus provided with a plurality of intelligent slave modules and a host processor for supervising the plane modules wherein the control process by the apparatus advances under the leadership of the slave modules.

The above-described problems involved in the conventional control apparatus seem to be attributive to the fact that the conventional control apparatus is not endowed with flexibility and expansibility of both hardware and software, nor is there uniformity of interfacing sufficient to meet various kinds of changes made on the side of the object to be controlled and/or the control function of the apparatus. Further, the managing of the control function is centralized. From this point of view, the present invention aims at improving the general-purpose control apparatus.

The control apparatus of the present invention for controlling an object including a plurality of controlled elements is provided with a host processer, a plurality of slave modules and a communication network for establishing communications between the host processor and the plurality of slave modules. The host processor supervises the whole apparatus and interprets a control program in response to a demand from each of the slave modules and generates a command for controlling the controlled object. Each of the slave modules is allotted to one of the controlled elements and has its own processor which interprets and executes commands for the controlled element allotted thereto, and upon completion of the execution of each command, generates a demand for a further command. Thus, through the above communication network, each command is transmitted from the host processor to the related slave module and each demand is transmitted from each slave module to the host processor.

The control apparatus according to the present invention has sufficient flexibility and expansibility with respect to both hardware and software and is able to provide users having varying requirements with systems of optimum scales. Further, it can meet various kinds of subsequent alterations in a simple manner. It is especially excellent in its adaptability to a higher-level control function such as coordinate control or adaptive control.

These and other objects, characteristics and advantages of the present invention will become apparent from the following description taken in conjunction with the accompanying drawings.

DETAILED DESCRIPTION OF THE PREFERRED EMBODIMENT

Figure 1:
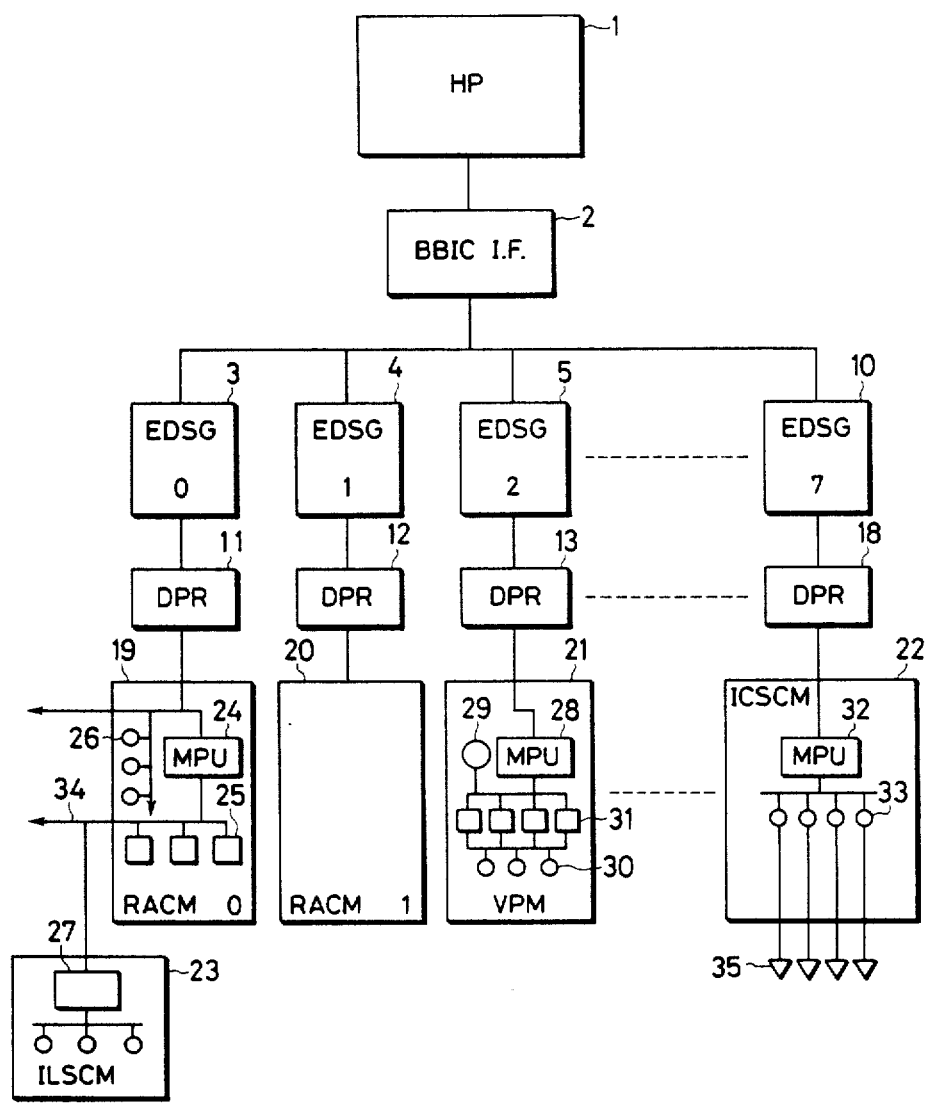
FIG. 1 is a block diagram of a control apparatus as an embodiment of the present invention.

FIG. 1 shows a control apparatus according to the present invention adapted to control two robot arms. In a host processor (HP) 1, there resides an operating system for supervising the entire apparatus, and a high-level language processing program for supporting the development of a control program and an object control program obtained through the former run under the supervision of the operating system. Further, the host processor 1 provides a man-machine interface for notifying the user of the state of the system or for helping him prepare control programs.

The host processor 1 is provided with a bus buffer and interruption control interface (BBIC I.F.) 2 and a plurality of (eight in the instant embodiment) extended data space generators (EDSG) 3-10 connected to the BBIC I.F., and to subordinate slave modules 19-22. Further, between the EDSGs and the slave modules, there are provided, as intermediate memories, dual-port RAMs (DPR) 11-18, respectively, which are accessible from both the host processor 1 and the respective slave modules 19-22. The BBIC I.F. 2 has a bus-buffer function and a control function for handling interruptions between the host processor 1 and the slave modules 19-22. The number of the EDSGs 3-10 is optional in principle and the upper limit of the number is mainly determined in consideration of the processing capacity of the host processor 1. Each of the EDSGs 3-10 has an address register and a data register for providing access to the DPRs 11-18 through which the host processor 1 can access a desired location in a desired one of the DPRs. In other words, this mechanism provides the host processor 1 with an I/O address space separated from the host processor's own physical address space for the communication with each slave module. As a result, there are interposed between the host processor 1 and all the slave modules equivalent address spaces and data input-output structures which enable the same or different kinds of slave modules to be uniformly connected to any EDSGs thereby allowing the control apparatus to have high flexibility and expansibility. Further, the abovementioned communication mechanism including both the EDSGs and DPRs gives a sufficient tolerance for bus-timing and makes it possible to provide a considerable distance between the host processor 1 and the slave modules 19-22. Moreover, the communications between the host processor 1 and the slave modules do not erode the host processor's own address space. Accordingly, little or no restriction is imposed on the hardware of the control apparatus and it is possible to use a general-purpose operating system for the host processor 1 instead of preparing a special one.

Next, the slave modules 19-22 will be described. The instant embodiment is so designed that it is capable of applying both adaptive control and coordinate control employing sensor- and visual-feedbacks to two articulated robot arms. Each of the slave modules 19-20 acts as a robot arm control module (RACM) for controlling a single robot arm, performs servo control and computations for motion control such as path computations, and stores constants such as teach points as required for those computations.

A master processor unit (MPU) 24 takes charge of the overall control of a first robot arm control module (RACM-0) 19 and servo operations, and performs the management of macro commands as basic control commands within the RACM-0 19 and communications with the host processor 1. The circles generally designated by reference numeral 26 represent local I/O control circuits of the master processor unit (MPU) 24, and rectangles generally designated by reference numeral 25 represent a group of concurrently operating processors for performing computations required for motion control at a high speed and with a high degree of accuracy. These processors 25 are connected to the master processor unit (MPU) 24 through a common bus 34 which is in turn connected to a master processor 27 of an outwardly extended intelligent local sensor control module (ILSCM) 23. The ILSCM 23 is an intelligent sensor control module peculiar to the RACM-0 19 requiring high speed sampling and is used for adaptive type high precision control. As to the hardware of the robot arm control module (RACM), a detailed description will be made hereinafter.

A second robot arm control module (RACM-1) 20 is a robot arm controller similar to the (RACM-O) 19 and controls another robot arm operating in coordination with the robot arm controlled by the (RACM-0) 19.

The slave module 21 is a visual processing module (VPM) for controlling the robot arm by visually recognizing the external conditions. Like the slave modules 19 and 20, the VPM 21 is provided with a master processor unit (MPU) 28 and a group of concurrently operating processors whch are generally designated by reference numeral 31 and which perform a high-speed visual processing by concurrent operations. A circle 29 represents a shared memory for exchanging status information for concurrent operations, and circles generally designated by reference numeral 30 represent shared frame memories for storing image data to be processed. Recognized data as a result of processing by VPM 21 is sent to the robot arm control modules (RACM) 19 and 20 through the host processor 1 so as to correct the path of each of the robot arms. The slave module 22 is an intelligent sensor control module (ICSCM) common to the slave module group, and like the RACMs 19, 20, VPM 21 and ILSCM 23, is provided with a master processor (MPU) 32. Further, it is also provided with sensor controlling I/0 control circuits represented by circles generally designated by reference numeral 33, and sensors represented by triangles generally designated by reference numeral 35 and connected to the I/O control circuits. Thus, the sensor information processed by the ICSCM 22 is sent to the robot arm control modules (RACMs) 19 and 20 and the visual processing module (VPM) 21 through the host processor 1 so as to be used as correction data.

As described above, all the slave modules have their own master processors thereby obtaining intelligence. Each of the slave modules has a set of macro commands corresponding to the basic control operations of the apparatus, and controls each controlled element keeping synchronism with one another under the direction of the host processor 1. Thus the modularization of both hardware and software is made possible, and the uniformity, expansibility, adaptability and other favorable characteristics of the apparatus can be obtained.

Figure 2:
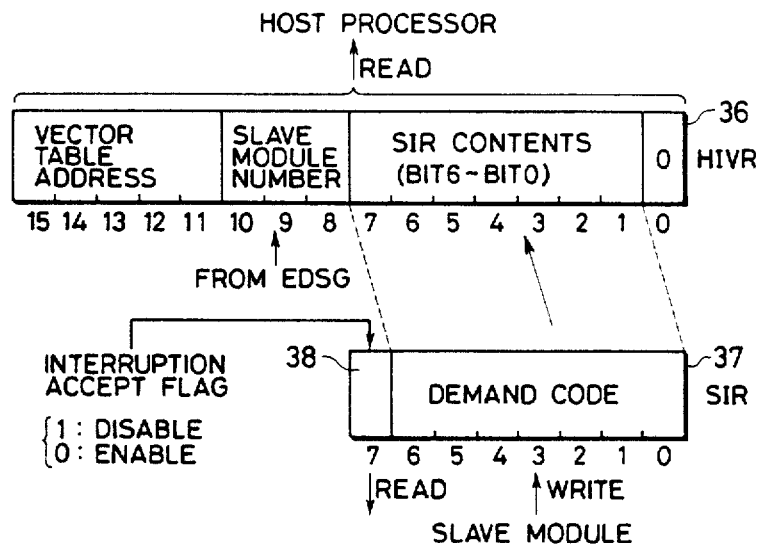
FIGS. 2 and 3 are schematic block diagrams, respectively, of information transmitting registers used for making interruption requests in the control apparatus shown in FIG. 1.

FIG. 2 shows an interruption information transmitting mechanism for handling an interruption request from each of the slave modules 19-22 to the host processor 1. In each of the extended data space generators (EDSG) there is provided a slave interruption register (SIR) 37, and in the bus buffer and interruption control interface (BBIC I.F.) there is provided a host interruption vector register (HIVR) 36. The SIR 37 is loaded by its associated slave module, and its content is modified within the HIVR 36 into the form of an interruption vector for the host processor 1. The SIR 37 is practically a predetermined location in each dual port RAM (DPR). When the slave modules 19-22 make a demand for a macro command end service of the host processor 1 with a notification of completion of the execution of a macro command or make a demand for a general service job such as the transfer of data, they refer to the eighth bit (bit 7) of the SIR 37, that is, an interruption acceptance flag 38 showing the acceptability of interruption, and if the flag indicates an interruption enable state, then write a service number (7 bits) in the SIR 37 as a demand code. Subsequently, in the bus buffer and interruption control interface (BBIC I.F.) 2, the content of the SIR 37 is shifted by one bit to the left, "0" is written at bit 0, a slave module number determined by the extended data space generators (EDSG) 3-10 is written at bits 8, 9 and 10, respectively, and further, information designating the location of a starting-address table (simply called an interruption vector table) for interruption service routines determined by the host processor 1 is written at bits 11-15 to form in the host interruption vector register (HIVR) 36 information for referring to the interruption vector table whereupon an interruption request to the host processor 1 is completed. Upon reception of the interruption request, the host processor 1 reads out the HIVR 36, and by referring to the interruption vector table according to the content of the reading, jumps to the head of the corresponding interruption service routine.

For each of the slave modules 19-22, there is provided one slave interruption register (SIR) 37. The interruption requests to the host processor 1 from the slave modules 19-22 through the slave interruption registers (SIRs) are presented to the host processor 1 after selection by the hardware in the bus buffer and interruption control interface (BBIC I.F.) 2 according to priority and the order of priority of these interruption requests is sequentially changed. Accordingly, all the slave modules can receive services of the host processor 1 substantially equally. Any interruption request which has not been accepted immediately is temporarily reserved, and as the priority order of the request is advanced, it will be accepted in due course without fail.

Figure 3:
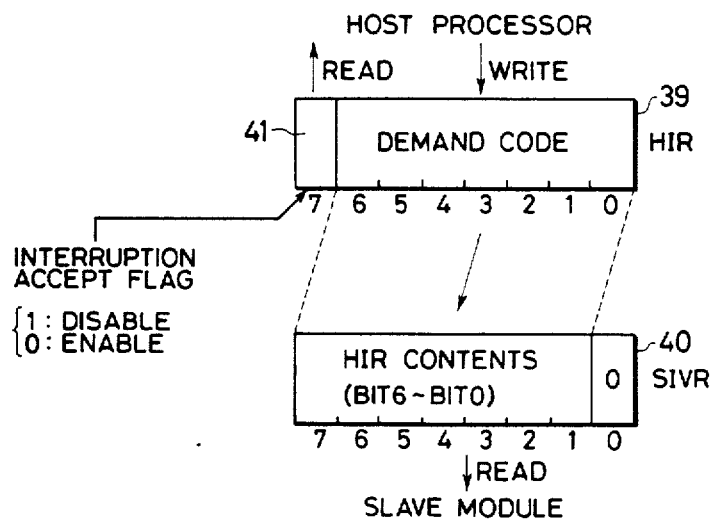

FIG. 3 shows a host interruption register (HIR) 39 in the EDSG for allowing the host processor 1 to make a compulsive demand for a service to each of the slave modules 19-22, and a slave interruption vector register (SIVR) 40 which is another predetermined location in each of the dual port RAMs (DPRs) 11-18. The HIR 39 is loaded by the host processor 1 and the content thereof is presented to each slave module after it is modified in the SIVR 40. This mechanism is basically similar to the above-mentioned combination of the slave interruption register (SIR) 37 and the host interruption vector register (HIVR) 36 except that additional information of the upper-place byte is produced and added in the master processor after the slave module receives the information in the SIVR 40. The source of interruption requests to each of the slave modules is only the host processor 1, and therefore, it is not necessary for the SIVR 40 to have a slave module number field and a selecting function according to priority as seen in the HIVR 36. When a certain value is written in the SIR 37 or the HIR 39 and an interruption request is accepted, the interruption acceptance flag 38 shown by bit 7 of the SIR 37 in FIG. 2 or a like flag 41 shown by bit 7 of HIR 39 in FIG. 3 is automatically set to an interruption disable state. Thereafter, at an appropriate time when another interruption request can be accepted without contradiction, the host processor 1 and the master processor of each of the slave modules restore the flags 38 and 41, respectively, to an interruption enable state through the software.

The exchange of information between the host processor 1 and the slave modules can be roughly classified into four cases and the information formats transmitted in these cases will be described below.

Figure 4:
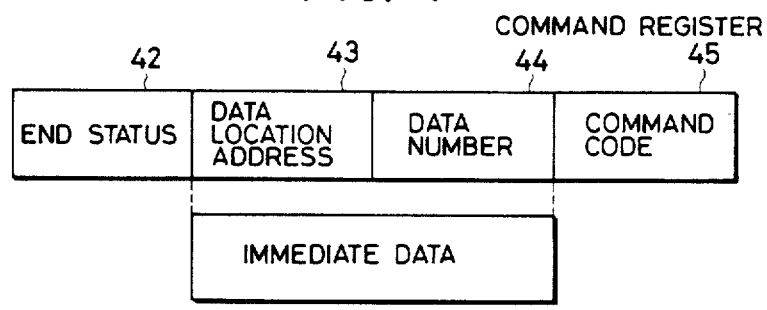
FIGS. 4 through 7 show formats of information transmitted in the apparatus shown in FIG. 1.

The first case is the transmission of a command to the slave modules from the host processor. FIG. 4 sows a format of information for command transmission formed in each of the dual port RAMs (DPRs) 11-18. The term "command transmission" means the issuance of a macro command from the host processor to the slave module, and such command issuance is always performed sequentially with respect to one slave module. In other words, when a slave module is executing a certain macro command, it is not possible to issue another macro command to that same slave module until the first macro command is completed. Accordingly, a command register for holding a macro command to be transmitted is provided in each of the dual port RAMs (DPRs) 11-18, and the interruption register shown in FIG. 3 is not used. The information format comprises an end status field 42, a data location address field 43, a data number field 44 and a command code field 45. The end status field 42 receives from the host processor a job program number to which the associated macro-command belongs. The content of this field 42 is written in the slave interruption register (SIR) 37 as an end status for echoing-back when the slave module demands a command end service of the host processor after this macro command is executed. The data location address field 43 holds a location address in the dual port RAMs (DPRs) 11-18 for the required data, the data number field 44 holds the number of transmitted data and the command field 45 holds a command code. The command code field 45 is simply called a command register. Usually, the host processor 1 writes the required data in the dual port RAMs (DPR) 11-18 and then writes information in these four fields. The slave module watches the command register 45, and when a macro command is set, analyzes it and gets the required data according to the data location address and the number of data, thereby processing the macro command. For several macro commands, the fields other than the command code field can be omitted. Further, for a command requiring only a small amount of data, an immediate data format may be employed according to which data 46 itself is written in the data location address field and the data number field.

Figure 5:
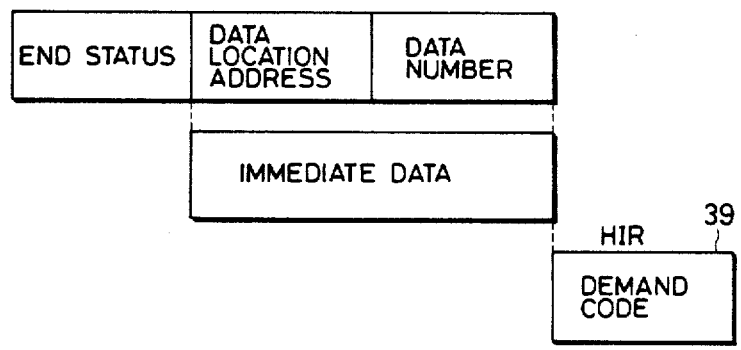

The second case is the service demand from the host processor to the slave module. FIG. 5 shows a format for this demand. This format is the same as the first case except that a service number is written in the host interrupt register (HIR) 39 instead of the command register 45, as a demand code. This service demand causes an interruption to take place in the slave module, and therefore, it can be accepted concurrently with the execution of a macro command unless another interruption service is being executed. The host processor 1 stores the required data in the dual port RAMs (DPRs) 11-18, and after writing information required for each field, checks the interruption acceptance flag 41 in the HIR 39, and when an interruption enable state is indicated, writes a service number in the HIRR 39. As a consequence, an interruption takes place in the slave module and the host processor can now receive the service processing by the slave module. This information transmitting method supports the transfer of data mainly among the slave modules (through the host processor) and between the host processor and the slave modules.

Figure 6:
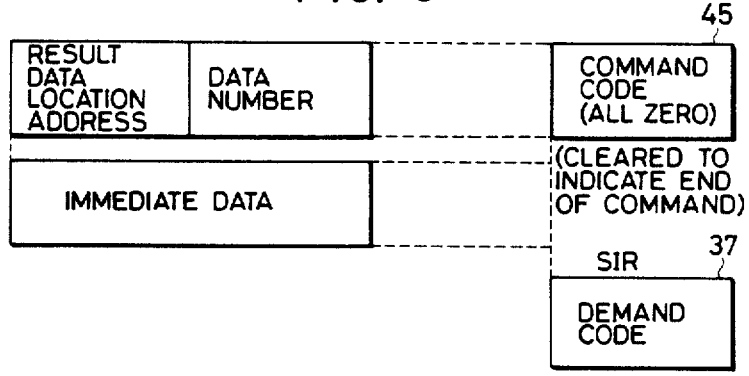

The third case is the command end processing service demand from the slave module to the host processor 1 for requesting the host processor to effect an end processing for a finished macro command processing. This case makes a pair with the first case. FIG. 6 shows a format for this demand. The structure of addressing information is the same as those mentioned in the first and second cases, and comprises a result data location field designating the location of processed result data and a data number field designating the number of the data. When the execution of a macro command is terminated and there is a processed result to be returned or it is necessary to echo back an end status, the slave module writes the processed result (if any) in its own dual port RAM (DPR) and forms an addressing field, and then writes "all zero" (The code "all zero" designates no-operation.) to clear the command register 45 of FIG. 4. Then the slave module subsequently checks the interruption acceptance flag 38 in the slave interruption register (SIR) 37, and when the host processor 1 is in an interruptable state, writes in the SIR 37, as a demand code, the end status transmitted by the method mentioned in the first case, that is, the job program number from which the macro command which has just been executed was issued. Thus, when the demand code is written in the SIR 37, an interruption takes place in the host processor 1 to update the program step of the corresponding job program or to cause the next macro command to be issued by a command statement routine. The post-processing of the above mentioned steps by the host processor 1 will be described in detail hereinafter.

Figure 7:
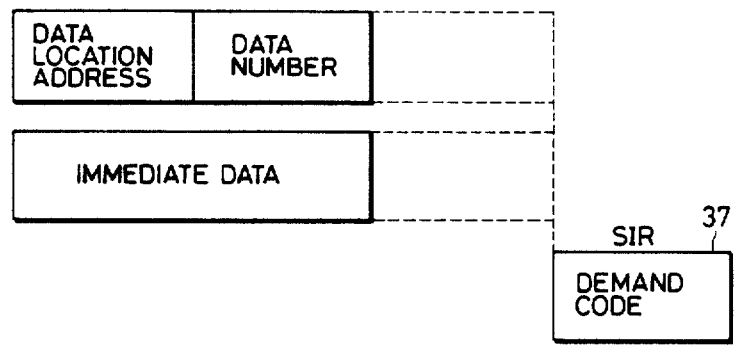

The fourth case is the general service demand from the slave module to the host processor. FIG. 7 shows a format for this demand. In this type of information transmitting operation, the host processor takes procedures same as those mentioned in the third case except that the routine started in the host processor 1 in the instant case is not a task relating to a job program but a mere service job routine. In the instant case, the slave module writes the required data in its own dual port RAM (DPR), and after setting the location address and the number of the data, writes in the SIR 37 not an end status but a service job number as a demand code without the necessity of clearing the command register 45. This information transmitting method corresponds to the method in the second case and supports the transfer of data mainly among the slave modules (through the host processor) and between the host processor and the slave modules.

Thus the information is transmitted between the host processor and the slave modules in a unified mode according to the above-mentioned four information transmitting formats. The variation of addressing is shown by differences among command codes or demand codes.

The various kinds of cooperations performed between the host processor 1 and the slave modules 19-22 by use of the above-mentioned four types of information transmissions will now be described.

To begin with, a sequence of processings within the host processor 1 carried out on a control program by use of the command transmitting mechanism from the host processor to the slave modules and the end processing service demand mechanism from the slave modules to the host processor shown in FIGS. 4 and 6 will be described.

Figure 8:
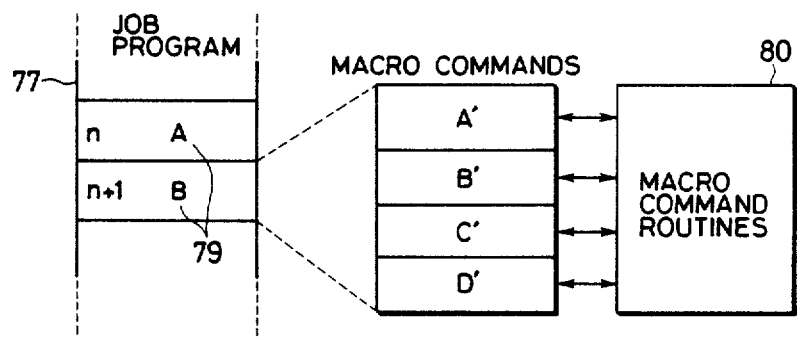
FIG. 8 is a view showing a configuration of a job program for use with the control apparatus shown in FIG. 1.

The control program consists of a plurality of job programs. The internal structure of a job program is shown in FIG. 8. As shown, the job program 77 is internally an assembly of program steps managed according to line numbers and basically processed in order of the line number with the exception of commands relating to branch and subroutine call. Further, there is written in each job program step a unitary command word 79 called a command statement which in turn is composed of macro commands A', B', C' and D'. Each of the macro commands is processed by a command routine 80 prepared in the host processor 1 or each of the slave modules 19-22.

Figure 9:
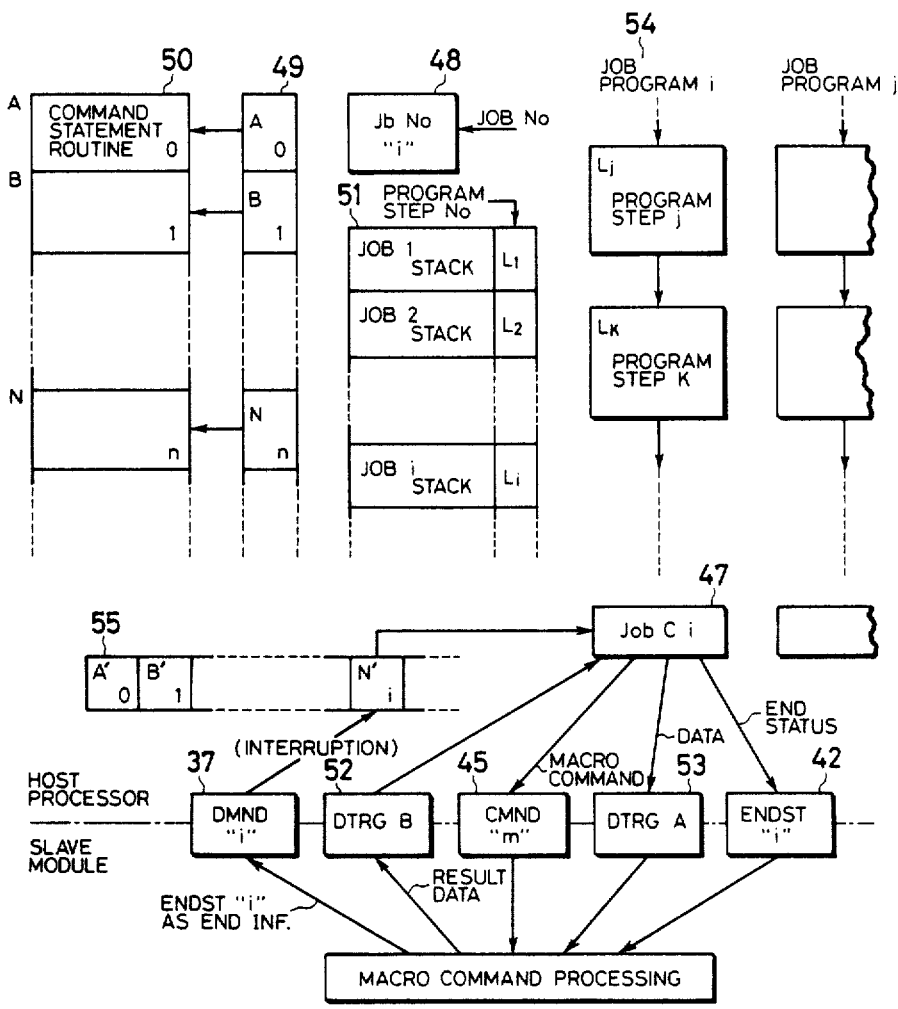
FIGS. 9 and 10 are schematic block diagrams showing control program processing mechanisms in the host processor and in the slave module shown in FIG. 1, together with an information transmitting mechanism between the host processor and the slave module.

FIG. 9 shows various kinds of tables for processing job programs and a mechanism for exchanging commands, service demands and data between the job programs in the host processor 1 and the slave modules through various kinds of register fields. In the instant control apparatus, a plurality of job programs run parallel with one another, but described hereinafter is a flow of processing a certain job program i 54. It is noted that each job program is associated with a job controller which decodes the job program described in the intermediate code to manage and control the job program, thereby acting as a so called interpreter. The job program i 54 has a job controller i (Job Ci) 47 associated therewith. When a service to the job program i 54 is demanded for the execution of a new program step, the job controller i (Job Ci) 47 writes a job number i in a job number register (Job No) 48 to show that the job program i 54 is receiving the service as an initial operation. Then it refers to a command statement routine starting address table 49 on the basis of a command statement number n as an intermediate code in a command statement described in the program step to be processed of the job program i 54, and turns over the control, according to an address N designated in the table 49, to the corresponding command statement routine n in a command statement routine group 50 which actually executes the processing of the command.

The command statement routine n refers to the job number register 48 and selects, as a work area, a job i stack corresponding to the job number i written therein from a job stack group 51. When the job controller i (Job C i) 47 receives the command statement intermediate code, it transfers an operand data section of the command statement showing operand data required for the execution of the command to the job i stack as it is. This transfer of the operand data section can be executed without decoding the command. The started command statement routine n issues a macro command required for executing the process designated by the command statement n after it has obtained the necessary initial data at the job i stack.

Some macro commands are executed by the host processor 1 itself and other macro commands are executed by the slave modules 19-22. The macro commands to be executed by the host processor itself including the transfer and exchange of data between itself and the slave modules are subsequently processed within the command statement routine n. As to a macro command to be assigned to one of the slave modules, the host processor 1 usually checks the command register (CMND) 45 associated with the corresponding slave module. Then, when the register 45 has been cleared and the slave module is in a no-operation state so that it can accept a macro command, the host processor 1 stores data in the dual port RAM (DPR) connected to that slave module, sets addressing information and an end status i in a data register A (DTRGA) 53 (covering the fields 43 and 44 in FIG. 4) and the end status register 42 (ENDST), respectively, and finally sets a macro command m to be executed in the command register 45, thereby asking the slave module for the execution of the macro command.

The host processor 1, after asking the slave module for the execution of the macro command and storing the current status in the job stack 51, starts a background operation in which mostly man-machine interface software is at work for the purpose of making effective use of a free time until a service demand interruption is requested. As the basic procedure upon completion of the execution of the assigned macro command, the slave module stores the processed result in its associated dual port RAM (DPR) when an interruption to the host processor is accepted, sets its addressing information in a data register B (DTRGB) 52, and writes an end status i in the slave interruption register (SIR) 37 whereby a command end service demand interruption is requested to the host processor 1. In this case, the command register 45 is cleared simultaneously so as to show that the processing of the next macro command is ready.

When the host processor 1 receives the above interruption request, the background operation is interrupted and a conventional interruption handling circuit (not shown) refers to an interruption service routine starting address table (interruption vector table) 55 in accordance with the echo-back information i in the SIR 37 showing the end status, and starts the job controller i 47 designated by the entry in the table. The job controller i 47 refers to flags showing the command execution status in the job i stack, and if the execution of the command statement n has not completed yet, sets the job number i again in the job number register 48 so as to show that the service for the job number i is being executed, and then re-start the command statement routine n by referring to the command statement routine starting address table 49 in accordance with the intermediate command statement code of the command statement n under execution. In this case, the transfer of operand data to the job i stack is not performed because it is unnecessary. Thus, when the command statement routine n is re-started, it restores its status from the job i stack, performs post-processing of the result of the processing by the slave module, and if there is any macro command to be executed, issues such macro command in the above-mentioned manner.

Basically, the above processings are repeated until all the processings of the required macro commands are completed. When the command statement routine n completes all the required processings designated by the command statement n, it indicates the completion of the processing of the command statement n on a command execution status flag in the job i stack, and after updating the value L of a program step number register (which is arranged in the stack and which holds the program step number to be executed) to the job step number to be executed next, the control is returned to the job controller i 47. The job controller i 47 acknowledges the updating of the program step L from the Job i stack and starts the initial operation mentioned above for processing the next command statement. Through the above sequence of processings, the host processor 1 heteronomously proceeds with the macro command or macro statement processing for the job program in response to the command end processing service demands from the slave modules. Accordingly, the host processor 1 can allot to the background operation most of the time during which the processings of the macro commands are executed by the slave modules.

As will be understood from the above description, one of the characteristics of the present invention resides in the decentralized system control which is performed by use of interruptions under the leadership of the autonomous intelligent slave modules. With the exception of particular cases, no interruption to the host processor 1 is allowed when a job is being processed in the plane modules-host processor, and in principle, the host processor can accept interruptions only when the background operation is being executed. As it is possible to start another job program in this period, a plurality of jobs can be autonomously and concurrently carried out, and this is called a multijob function. During the time after the execution of a macro command is assigned to a slave module and in which no service is required to be made for any job program, the background operation is carried out continuously. As already described in the foregoing, this background operation usually includes the indication of a system condition to the user, acceptance of directions from the user and their reflection on the control operation that follows, edit and compile processings and others all of which are called man-machine interface processings. According to this system, it is possible to make effective use of a free time for the host processor 1 during the time of execution of a macro command by the slave module, which may occupy more than half the processing time. In addition, since the job is operated in synchronism with the progress of processing in the slave module, the operation time of the host processor is not wasted and the overhead for multijob control can be reduced resulting in a reduction in the processing load on the host processor. Further, the addition of concurrently operated job programs and the additional provision of new command statements are facilitated thereby implementating the multijob function having sufficient expansibility and flexibility.

Next, the information transmission sequence which is carried out between the host processor 1 and the slave modules by making use of the service demand mechanisms shown in FIGS. 5 and 6, and the macro command processing sequence within the slave modules will be described.

Figure 10:
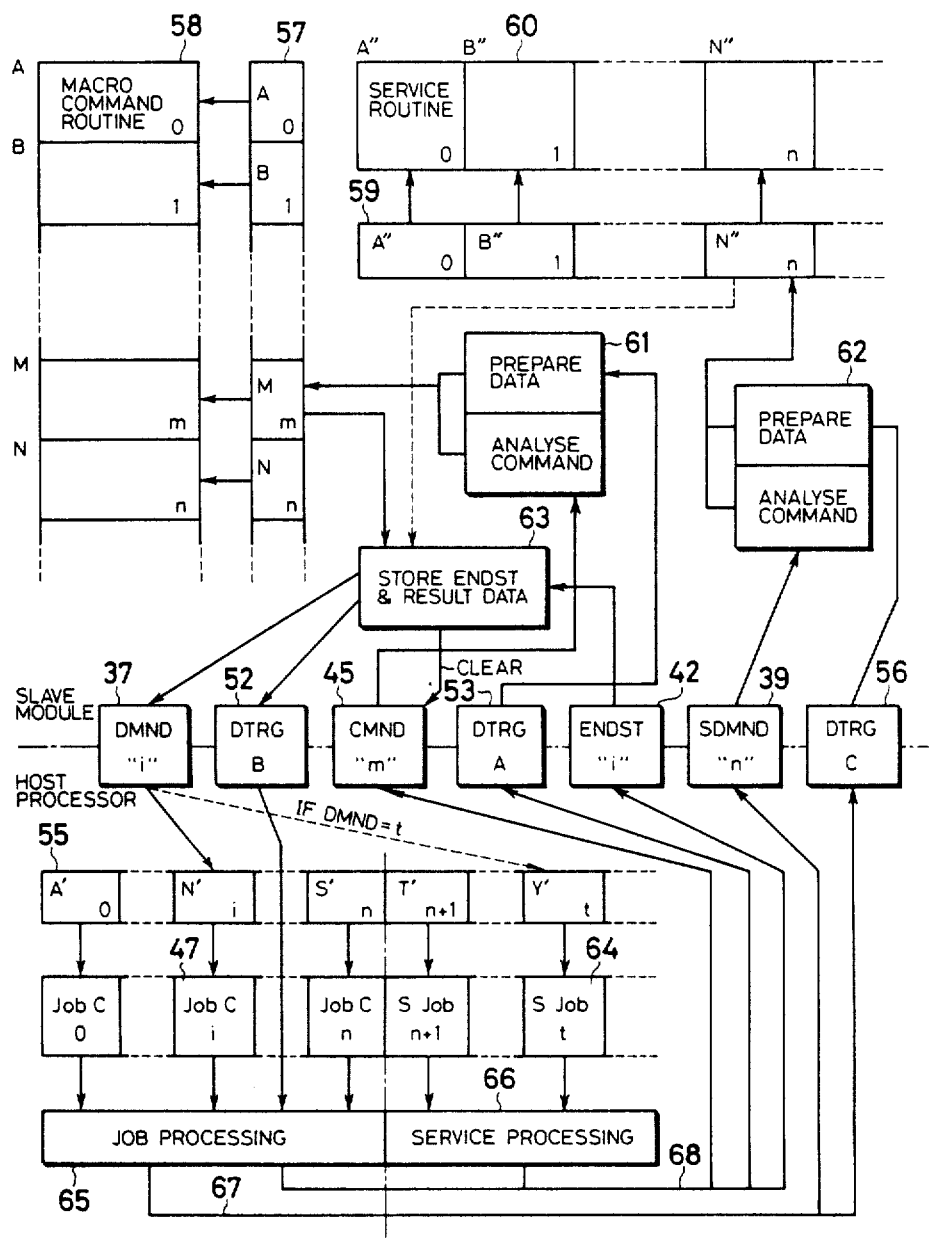

Referring to FIG. 10, the service demands to the host processor 1 and the slave module are supported by interruptions through the slave interruption register (SIR) 37 and the host interruption register (HIR) 39 shown in FIGS. 2 and 3. The command register 45 is monitored by the master processor of the slave module associated therewith, and when a valid macro command number is written in therein, the processing of the macro command in the slave module is started. More particularly, the master processor of the slave module actuates a routine 61 to convert addressing information in the data register A (DTRGA) 53 indicating the location of the required data in the corresponding dual port RAM (DPR), into a form usable in a macro command routine group 58, and then starts the required macro command routine m by referring to a macro command routine starting address table 57 on the basis of a command code m in the command register 45. The macro command routine m interprets the macro command m and executes it.

When the execution of the macro command is completed, so long as the interruption acceptance flag 38 permits an interruption to the host processor 1, as already described, the slave module stores the processed result in its associated dual port RAM (DPR), sets its addressing information in the data register B (DTRGB) 52, and writes in the slave interruption register (SIR) 37 the end status information showing the job number of the job program which has issued the executed macro command, thereby echoing back to the host processor. At the same time, in order to inform the host processor 1 of the acceptability of another macro command, the command register 45 is cleared.

The service demand from the host processor to the slave module is performed by an interruption through the host interruption register (HIR) 39. Accordingly, concurrently with the above-mentioned macro command processing, another table, that is, a service routine starting address table 59, is referred to so that the shifting of processing to the required service routine is made. In case a service by one of the slave modules 19–22 is required, the host processor 1 checks the interruption acceptance flag 41, and when the interruption of the target slave module is permitted, stores the required data, if there is any, in the dual port RAM (DPR) associated with the target slave module, sets its addressing information in the data register C (DTRGC) 56, and writes in the host interruption register (HIR) 39 a demand code n (SDMND"n") showing a service number thereby requesting an interruption to the master processor of the target slave module. Upon acceptance of the interruption request, the master processor of that slave module produces addressing information of a suitable form from the content of the data register C (DTRGC) 56 by means of a routine 62, and then selects from a service routine group 60 a service routine n corresponding to the demand code n by referring to the service routine starting address table 59 and starts it. If necessary, the processor 1, as in the case of the transmission of commands, may add a suitable end status to the service demand. In this case, the slave module echoes back the end status together with the command end service demand through the SIR 37. The end status to be echoed back is not limited to a job program number but may be a general service number, and the jobs started in response to the echoing-back are job controllers (Job C) generally designated by reference numeral 47 or service jobs (S Job) generally designated by reference numeral 64 in accordance with a demand code. Upon completion of the service job, the interruption acceptance flag 41 is set to an interruption enable state.

The basic processing sequence for a service demand from the slave module to the host processor with the inclusion of the above-mentioned command end processing service demand is as follows: When the interruption acceptance flag 38 on the side of the host processor 1 indicates that an interruption to the host processor 1 is acceptable, the slave module stores in the dual port RAM (DPR) associated therewith the necessary data, sets its addressing information in the data register B (DTRGB) 52, and then writes a demand code i or t showing a service demand number in the slave interruption register (SIR) 37 so as to issue the service demand to the host processor 1. Upon reception of the demand, the host processor 1 refers to the interruption service routine starting address table 55 showing the starting addresses of job programs and service job programs and starts the program corresponding to the demanded service. The interruption service routine starting address table 55 is prepared one set for each slave module, and a table corresponding to the slave module having issued a demand is selected in accordance with the slave module number in the host interruption vector register (HIVR) 36. If the value i which is not larger than the maximum value n of the job program number is set in the slave interruption register (SIR) 37, the job controller i (Job Ci) 47 is started, and if the value t which is larger than n is set, one of general service job programs (S Job) 64 prepared for the respective slave modules is started. As will be understood from the above description, the entry from "0" to "n" in the interruption service routine starting address table 55 take the same value for every slave module so as to show the starting addresses of the job controllers corresponding to the job program numbers. Generally, a job program processing 65 and a general job program processing 66 have, as shown by lines 67 and 68, functions of getting access to the above-mentioned various kinds of registers 45, 53, 42, 39 and 56 for the transmission of information to the slave modules. Thus the information transmission mechanism of the present invention excels in uniformity, expansibility, and flexibility, and is suitable for general-purpose use.

In this embodiment, the background operation provides a function to monitor the overall system and a function of so called man-machine interface such as the output of system conditions to a CRT display, a printer and other output devices, the effectuation of miscellaneous manual operations performed through a keyboard, a light pen and other input devices, the producing, editing, debugging and compiling of job programs, etc., which support the interaction between the user and the system. In principle, the background operation is separated from various job processings which effectuate the control. However, as stated hereinabove, if, for example, a manual operation is required to meet an emergent or abnormal state, directions from the user must be able to be directly given to the system.

Figure 11:
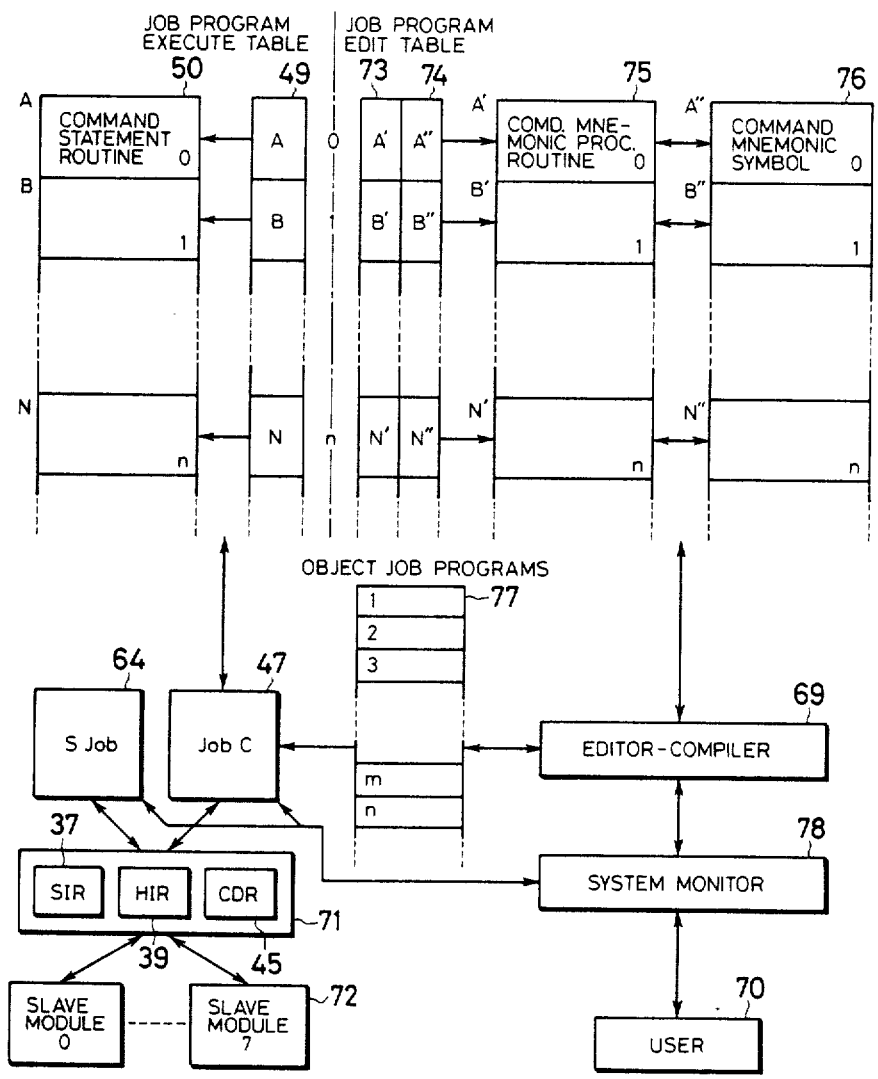
FIG. 11 is a schematic block diagram showing a relationship between a background operation and a control program.

FIG. 11 shows the system monitor function of a system monitor 78 which supervises control jobs preferentially running as a main work of the system and the editor-compiler 69 operating as a part of the background operation and which mediates between the above-mentioned jobs and the editor-compiler at the background; the function of the the editor-compiler 69 for performing the editing and compiling of job programs in cooperation with the user through the system monitor 78; and the relationship between various kinds of control jobs and the background operation.

As described hereinbefore, the slave modules generally designated by reference numeral 72 communicate with the job controller 47 and the service job 64 through the information transmitting register group 71 including the SIR 37, HIR 39 and command register (CDR) 45. The job controller 47 selectively starts the command statement routines 50 by referring to the command statement routine starting address table 49 thereby proceeding with the processing of a job program 77. The system monitor 78 supervises various kinds of control parameters and checks whether or not the job controller 47 and the service job 64 function without contradictions. Further, the system monitor 78 watches for emergent processing demands from the slave modules, and graphically displays parameters and indicator flags required for supervising the system conditions on a CRT so as to notify a user 70 of the system conditions. In case a manual emergent processing is required, the user 70 can alter the parameters so permitted and issues an emergent operation command under the control of the system monitor 78, and can thus take effectual countermeasures against emergent or abnormal conditions.

The editor-compiler 69 prepares job programs by communicating with the user 70 under the supervision of the system monitor 78. Character-string symbols expressing a command statement inputted by the user 70 through the keyboard are collated with command mnemonic symbols prepared in a command mnemonic symbol table 76 as they are inputted line by line so that a command intermediate code n corresponding to a command statement number n is found out. Then the corresponding one of a group of command mnemonic processing routines 75 separates the operand data section to convert it into numerical values, and merges those with a command intermediate code to form an object code in a predetermined format. These operations are repeated every time the user 70 inputs character-string symbols corresponding to a command statement, thereby completing the object job program 77. When the job program is to be shown to the user 70, a process in reverse of the above is followed. That is, a command mnemonic processing routine starting address table 73 and a command mnemonic symbol starting address table 74 are referred to in accordance with the command intermediate code included in each program step of the object job program 77, and the command statement and the operand data section are converted into the character-string symbols by the corresponding routine in the command mnemonic processing routine group 75 with reference to the command mnemonic symbol table 76, so that the results are displayed on the CRT in the form of a list. The user 70 can, under the supervision of the editor-compiler 69 and the system monitor 78, perform debugging operations such as alterations, additions or deletions on the list displayed on the CRT by making use of a screen editing function.

As described above, since various kinds of processing programs are all managed through the respective tables, the additions, deletions or other revisions of the command statements and macro commands are facilitated, so that the function of the apparatus can be improved easily by alterations on the part of software. Further, since the command mnemonic symbols can be easily defined, it is possible to support with ease a high-level programming language for control such as a high-level robot language.

Next, a function for achieving coordinated and concurrent processings of concurrently operable processes by allowing data exchange between those processes and by synchronizing them will be described. This function enhances the control function of the apparatus of the present invention.

In the instant embodiment, it is possible to register "n" job programs and to run them in parallel. Further, all the slave modules and the host processor can perform their macro command processings in parallel so long as the mutual timing among their operations is not restricted. That is, the slave modules can basically operate concurrently since each of them has its own processor and can operate autonomously. In the instant embodiment, the functions to support the coordinated parallel running of a plurality of job programs and the concurrent processing of concurrently processable macro commands are realized by the command statement for synchroniation of concurrent processes and common parameters for the exchange of data or status among parallel running job programs.

Figure 12:
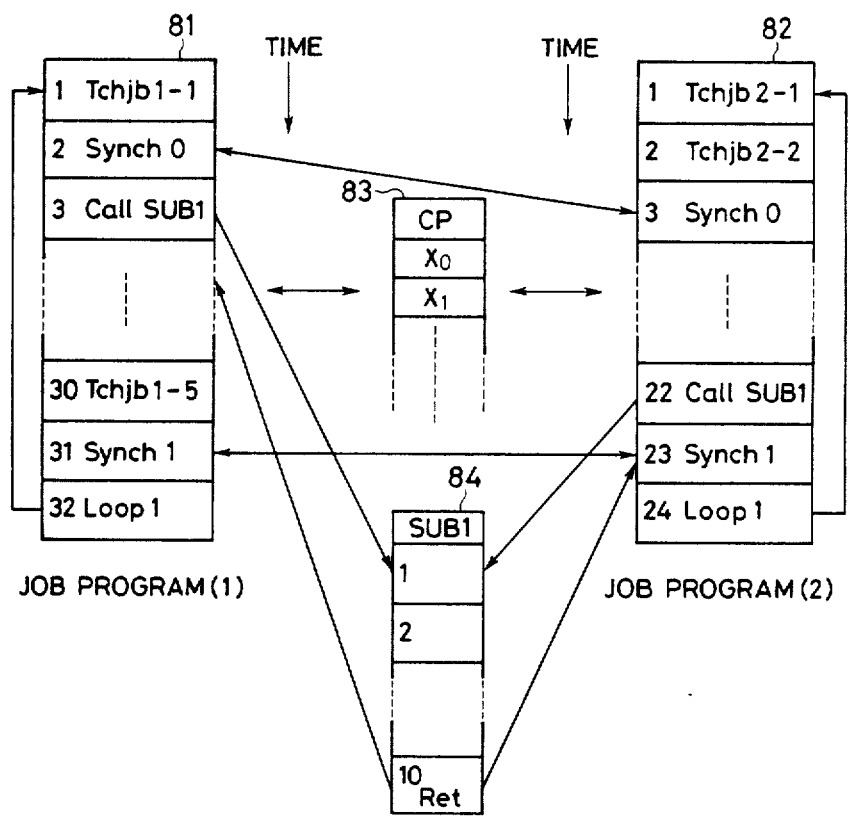
FIG. 12 is a schematic block diagram showing cooperative processing of two control job programs.

FIG. 12 illustrates the synchronization between job programs and the joint-ownership of parameters and subroutine programs by giving an example of the concurrent processing of two job programs to be executed synchronously for coordinate control. As shown, a job program (1) 81 and a job program (2) 82 are each executed in order of program step number given on the left with the program steps forming a loop such that when each program has been executed as far as the last step, it jumps back to the first step. It is assumed that these job programs have restrictions on the mutual timing between their processings, and that synchronization between the processings must be assured from time to time. For this purpose, synchronizing commands "Synch n" are inserted in suitable program steps of both programs. In the shown example, a synchronizing commands "Synch n" is inserted in the program step 2 of the job program (1) 79 and the program step 3 of the job program (2) 80, respectively. As a result, the program step 3 of the job program (1) 79 and the program step 4 of the job program (2) 80 are simultaneously started. Generally, job programs including synchronizing commands "Synch n" having the same operand "n" are synchronized with one another automatically at the starting point of the execution of program steps next to the synchronizing commands. The time of the start of execution of the synchronized program steps is immediately after the execution of the last one of the "Synch n" commands in the job programs included in the objects of synchronization.

The synchronization by the "Synch n" command is performed internally according to the following sequence. That is, when the job controller fetches a "Synch n" command statement and starts the command statement routine corresponding thereto, the started command statement routine examines a sync starting flag for the "Synch n" to see if the synchronizing processing according to the "Synch n" command has already been started in other job programs to be synchronized, and if it has been cleared, set the flag so as to show the synchronizing processing has just started. Next, the content of a sync register for the "Synch n" is incremented by one, and the number of job programs to be synchronized with one another by the "Synch n" command is compared with the content of the sync register. The number of such job programs is given in advance by the compiler. If, after the comparison, they do not coincide with each other, the command statement routine enables interruption and then shifts to the processing of a check loop for checking the sync register being cleared, as will be described later, by another job program. Generally, no interruption is allowed when either the job controller or the command statement routine is in execution, but if a processing wait state due to a loop and the like is brought about in the course of processing a command statement executed by the host processor 1 alone or a long term processing is encountered, the necessary processing is executed after enabling interruption at a proper time. This method enables the operation of the job controllers for other job programs or the processing of a service job to be performed, and therefore, there is no fear of interfering with the progress of other concurrently operating jobs. The processing of the synchronizing command "Synch n" is also based on this principle.

After that, the job program which has reached the program step of the synchronizing command "Synch n" performs the same processing in sequence. The job program which has last reached the synchronizing command "Synch n" recognizes that the content of the sync register for the "Synch n" coincides with the number of jobs to be synchronized as a matter of course, clears the synchronizing register by writing "0" therein, shifts to the next program step after completing the processing of the synchronizing command "Synch n", and then returns, at a proper time, the control to the job program interrupted thereby. At the time of this returning, the interruption flag which has been saved in the system stack and which is to be restored to the status register of the CPU at the time of return is set to an interruption disable state. Then the returning to the check loop of the job program previously having started the execution of the "Synch n" command and the termination of the processing of the synchronizing command "Synch n" of its own are repeated in an order reverse to the order of the job programs in which the "Synch n" synchronizing register was incremented in sequence. In the course of such repetitive returning operations, the interruption flag which has been saved in the system stack and which was to be returned to the status register of the CPU at the time of the above returning operation is set to an interruption disable state after the job program gets out from the check loop, except the job program which performs the checking last, whereby it is assured that the synchronization processing is continuously carried out without being obstructed by irrelevant interruptions. According to the above sequence, the job program performing the checking last is the job program that has started the synchronization processing first. This job program terminates the processing of the synchronizing command "Synch n" by clearing the synchronization starting flag after it has gone out from the check loop, but it does not operate on the interruption flag. By changing the operand "n" of the synchronizing command "Synch n", it is possible to utilize the synchronizing function at a plurality of positions.

Common parameters (CP) 83 are defined in each job program requiring it and made usable by so declaring. Further, groups of common parameters may be declared and a Lock (M) command statement may be issued to specify to which job the right to use the respective groups belongs, so that the job program possesses the specified parameter group until it is unlocked. Thus, by use of the Lock (M) command statement, it is possible to alter or read out the contents of the common parameter groups.

A subroutine program 84 is a common subroutine program capable of being called from a plurality of concurrently operating jobs. As described previously, the job controller i and the job i stack exist in correspondence to each of the concurrently operating job programs i. However, the common subroutine program 84 has no dedicated job controller nor job stack. Therefore, when it is called from the job program i, it is processed using the job i stack under the control of the job controller i, and when it is called from the job program j, it is processed using the job j stack under the control of the job controller j. Consequently, it is possible to save the program step and to make a library of programs.

The above functions are generically called a multijob function, and by this function it is possible to support complicated control functions, for example, direct numerical control or coordinate control of a plurality of robots. Further, as this function naturally implies parallel processings, the processing efficiency and capacity of the system is improved accordingly.

Figure 13:
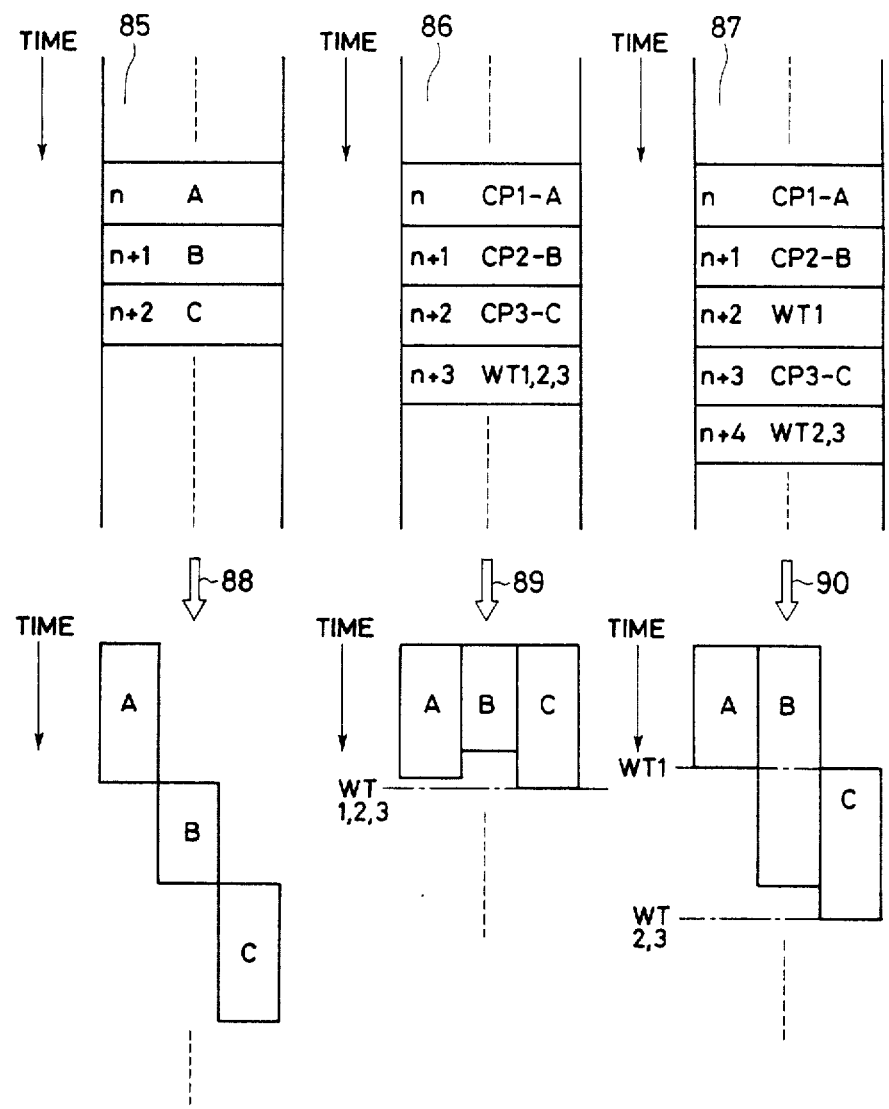
FIG. 13 is a block diagram showing control job programs including concurrent proceses and timings in the execution of those programs.

FIG. 13 shows ways of describing concurrent processes when programming for a plurality of slave modules is done within one job program, and sequences of execution of processes corresponding thereto. A job program 85 is of usual type, and command statements "A", "B" and "C" are processed in series in order of program step numbers n, n+1 and n+2 as shown by a downwardly pointing arrow 88. However, in case the command statements "A", "B" and "C" are processable concurrently by separate slave modules, respectively, a concurrent processing declaration is made by use of a concurrent processing prefix "CPn-" as seen in job programs 86 and 87, and in this case, a "WTn" command statement is used for the synchronization of concurrent processes in one job. A command statement "WT1, 2, 3" in the job program 86 is inserted for synchronizing concurrent processes "CP1-A", "CP2-B" and "CP3-C" with one another. In the sequence of execution of the job program 86, the processings of the "A", "B" and "C" are started substantially simultaneously as shown by a downwardly pointing arrow 89, and the processing of the next program step n+4 is started in synchronism with the termination of the processing of the "C" which terminates last. As shown by a downwardly pointing arrow 90, the job program 87 starts the processings of "CP1-A" and "CP2-B" substantially simultaneously as concurrent processes, waits for the "CP1-A" according to the next command statement "WT1", starts the "CP3-C" as a concurrent process after the termination of the processing of the "A", waits for the "CP2-B" and "CP3-C" according to "WT2, 3", and upon termination of the processings of "B" and "C", starts the processing of the next program step n+5. As will be seen from the above, a synchronizing command statement "WT1, m, n" is a command for waiting until all the processings of concurrent processes "CP1-X", "CPm-Y" and "CPn-Z" are terminated.

The internal processings of concurrent processes and "WT1, m, n" command statement are as follows: A concurrent process processing service job program is prepared for the post-processing of concurrent processes. In the processing of concurrent processes so declared, when the command statement routine transmits a macro command to the slave module, it gives the service job number of the concurrent process processing service job to the slave module as an end status instead of a job program number, and without ascertaining the termination of processing of this macro command, shifts to the next program step. The slave module which has received this macro command sets the service job number of the concurrent process processing service job in the slave interruption register (SIR) 37 when the macro command has been processed. As a result, the concurrent process processing service job, instead of the job controller, operates in the host processor 1 which has received a command end processing service demand, and sets a concurrent process end flag so as to show that the designated concurrent process has terminated. When the job controller fetches the "WT1, m, n" command statement and the corresponding command statement routine is started, the concurrent process end flags corresponding to the parameters "1", "m" and "n" are checked for ascertaining the termination of all the processings of the concurrent processes designated by those parameters, and such checking is repeated until all the flags are set. During the above operation, an interruption enable state is maintained so that other jobs can be processed. When the termination of all the concurrent processes designated by the "WT1, m, n" command statement has been successfully checked, the processing of the next program step is started, and the concurrent process end flags are all cleared. Thus, in the above manner, the parallel processing of concurrent processes within one job becomes possible thereby improving the processing capacity of the system.

Lastly, a detail of the slave module will be described. In the case of the present invention, a controlled object is divided into several controlled elements according to the difference of functions, and each of the slave modules takes charge of the control of one controlled element.

The controlled object of the instant embodiment comprises a plurality of robot arms and groups of various kinds of sensors for adaptively controlling the robot arms according to the features and characteristics of a working object as well as various working environments, these robot arms and sensors forming a single system. As examples of slave modules required for controlling such controlled element, there are shown in FIG. 1 the robot arm control modules (RACMs) 19 and 20, the visual processing module (VPM) 21 which grasps the characteristics of the working object by recognizing a body through vision control and an intelligent common sensor control module (ICSCM) 22 which recognizes the working environment of the system and reflecting the recognized result on the control of the entire system. Further, the RACM 19 is provided with the intelligent local sensor control module (ILSCM) 23 for supplying at high speed sensor information peculiar to the robot arm. As described previously, the modules are intelligent units each having its own master processor and performing the processing of macro commands and service demands transmitted from the host processor as independently and autonomously as possible.

Figure 14:
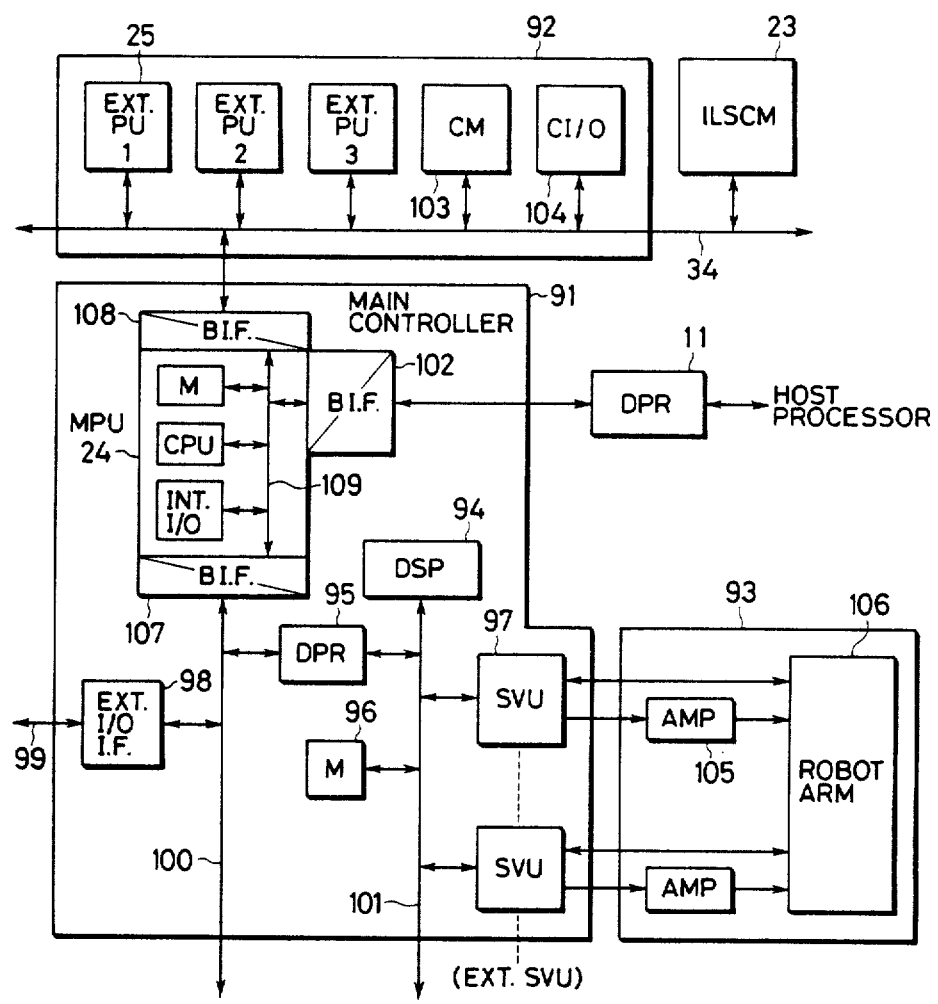
FIG. 14 is a block diagram of one of the slave modules for controlling a robot arm.

FIG. 14 shows a hardware structure of the robot arm control module (RACM) 19 as is representative of the slave modules. A main controller section 91 including the master processor unit 24 is so formed that it can itself function as a stand-alone type simple control unit. The master processor unit 24 includes a CPU, a memory (M) and an internal input-output control unit (INT. I/O) including peripheral chips for functionally asisting the elements of the master processor unit 24 and an internal local bus 109. The bus 109 is connected to a master local bus 100 through a bus interface (BI.F) 107. An interface group 98 for external I/O devices connected to a master local bus 100 provides a function enabling several required I/O devices to be directly connected outside the system, as shown by an arrow 99. A data signal processor (DSP) 94 which forms part of a high-speed digital servo system is connected to the master local bus 100 through the dual port RAM (DPR) 94 and to a memory (M) 96 through a bus 101. A servo unit (SVU) 97 controls a servo amplifier 105 and an articulated robot arm 106 within a controlled object 93. The unit 97 includes an encoder counter, etc. and acts as an interface between the DSP 94 and the controlled object 93 for digital servo processing. One servo unit (SVU) 29 is provided for each shaft of the articulated robot arm, and additional servo units (SVU) may be connected to the bus 101 of the DSP 94 so as to meet an increase in the number of shafts of the robot arm.

The master processor unit 24 is connected to the host processor 1 from its internal local bus 109 through a bus interface (BI.F) 102 and the dual port RAM (DPR) 11. As another characteristic, the internal bus of the master processor unit 24 can be connected to the common bus 34 through a bus interface (BI.F) 108, and to the bus 34 a parallel computation unit 92 can be connected. Such expansion makes it easy to meet the increasing control computations resulting from the complexity of the controlled object and the necessity of high-speed and high-precision control. The parallel computation unit 92 includes a plurality of extended processors (EXT.PU), a common memory (CM) 103 and a common I/O control unit (CI/O) 104, and it is possible to add further extended processors in proportion to the computation load. Thus the parallel computation unit 92 can provide a multi-instruction stream multi-data stream (MIMD) type purely parallel high-speed processing function capable of performing complicated computations such as joint angle computations using a high-speed sampling, torque computations and dynamics computations required for controlling the motion of the robot arm by analyzing them to the level of the four elementary arithmetic operations, thereby improving the real-time processing capacity of the system. The commands and data are supplied to the parallel computation unit 92 by the master processor unit 24, and the exchange of information is performed in the common memory (CM) 103. Further, the common bus 34 can be connected with the intelligent local sensor control module (ILSCM) 23 (See FIG. 1) which is particularly required for controlling the robot arm, and this module performs the control of the sensors requiring high-speed sampling and the processing of outputs of the sensors. As the common bus 34 can be connected with processor units of a variety of applications, it is considered to be a system bus for the robot arm control module 19 so that it is possible to form a hierarchical structure having the robot arm control module (RACM) 19 as a host by connecting the subordinate slave modules represented by the sensor control module (ILSCM) 23.

What is claimed is:

1. A control apparatus for controlling a controlled object which includes a plurality of controlled elements, comprising:
   a host processor for supervising said control apparatus and for interpreting successive steps of subprograms included within a control program to generate commands for the control of said controlled elements in response to respective demand signals, each command including first designation information for designating a subprogram to be processed after the execution of said each command;

a plurality of slave modules each slave module being allotted to one of said controlled elements, respectively, and includes a processor for interpreting and executing said commands to generate control signals for said allotted controlled element and for generating, upon completion of the execution of said each command, a demand signal for requesting said host processor to generator another one of said commands, said demand signal includes second designation information for designating a subprogram to the processed in said host processor; and communication means for transmitting said demand signals from said slave modules to said host processor and said commands from said host processor to said slave modules.

2. A control apparatus as claimed in claim 1, wherein said second designation information designates a subprogram which corresponds to a first subprogram designated by said first designation information, said first designation information being included within a command recently executed by said processor of said each slave module.

3. A control apparatus as claimed in claim 2, wherein said first designation information of said command recently executed designates a subprogram from which said recently executed command was derived.

4. A control apparatus as claimed in claim 2, wherein said first designation information of said command recently executed designates one of said subprograms which either corresponds to or is other than the subprogram from which said command recently executed was derived.

5. A control apparatus as claimed in claim 4, wherein a plurality of said commands transmitted to different ones of said slave modules may each include first designation information designating said first subprograms.

6. A control apparatus as claimed in claim 1, wherein said communication means comprises:

a plurality of memories connected to said host processor and to said slave modules, respectively, each of said memories including an area into which said host processor writes a command and out of which said slave module connected thereto reads said command, said area including a first field for storing information identifying a control operation and a second field for storing said first designation information; and interruption means connected to said host processor and to said slave modules for permitting said slave modules to interrupt said host processor, and including interruption information transmitting means for transmitting said second designation information from each of said slave modules to said host processor.

7. A control apparatus as claimed in claim 6, wherein said interruption information transmitting means includes means for receiving said second designation information from each of said slave modules, and modifying means for modifying said received second designation information to form information which identifies an interruption service routine for a designated subprogram.

8. A control apparatus as claimed in claim 7, wherein said modifying means includes means for adding to said second designation information a first value which identifies a location of a table of starting locations of said interruption service routines.

9. A control apparatus as claimed in claim 8, wherein said modifying means further includes means for adding to said second designation information a second value which identifies a salve module.

10. A control apparatus as claimed in claim 9, wherein said modifying means further includes means for shifting said second designation information by a predetermined number of bit positions.

11. A control apparatus as claimed in claim 10, wherein said modifying means includes a first register and a plurality of second registers connected to said first register, said second registers being further connected to said slave modules, respectively, for receiving said second designation information therefrom, and said first register including a first section for receiving shifted second designation information from each of said second registers, a second section for receiving said first value, and a third section for receiving said second value, and being connected to said host processor for supplying its content thereto.

12. A control apparatus as claimed in claim 1, wherein said processor in each of said slave modules includes a set of command routines, corresponding to a set of commands necessary for controlling the corresponding allotted controlled element for interpreting and executing said commands.

13. A control apparatus as claimed in claim 12, wherein each of said subprograms comprises a series of command statements, said host processor includes a set of command statement routines corresponding to a set of command statement codes for intrepreting said command statements into said commands.

14. A control apparatus as claimed in claim 13, wherein said host processor includes a first table indicating the correspondence between said command statement codes and said command statement routines, and said processor in each of the slave modules includes a second table indicating the correspondence between said commands and said command routines, said first and second tables being utilized for selecting one of said command statement routines and one of said command routines respectively to be started.

15. A control apparatus as claimed in claim 14, wherein each of said subprograms has a subprogram controller routine which is started in response to said second designation information, said subprogram controller controls the processing of the designated subprogram.

16. A control apparatus as claimed in claim 15, wherein said host processor includes a subprogram number register for storing a number identifying the subprogram being processed by said host processor, and a plurality of job stacks, each job stack corresponding to one of said subprograms and including a working area for said corresponding subprogram and a program step register for storing a number identifying the step of said corresponding subprograms to be processed, said number stored in said subprogram number register being set by a subprogram controller routine upon initiation of processing of said corresponding subprograms and said number stored in said subprogram number register being utilized by said command statement routine for accessing said job stacks, and said number stored in said program step register being updated by said command statement routines upon completion of the processing of each step of said subprogram corresponding to said program step register and said number stored in said program step register being utilized by said subprogram controller routine for selecting one of said command statement routines to be started.

17. A control apparatus as claimed in claim 1, wherein said host processor includes background programs to be executed when processing of said control program is not needed.

18. A control apparatus as claimed in claim 17, wherein said background programs includes an editor and compiler program having a set of command mnemonic processing routines corresponding to a set of command mnemonic symbols used by users in source command statements for converting source command statements to said command statements for said host processor and vice versa, and a table indicating the correspondence between said command mnemonic symbols and said command mnemonic processing routines.

19. A control apparatus as claimed in claim 18, wherein said background programs include a system monitor program providing a user with a man-machine interface and monitoring the operating state of said control apparatus thereby permitting rapid identification and resolution of emergent or unusual conditions.

20. A control apparatus as claimed in claim 1, wherein at least one of said slave modules further includes a plurality of additional processors operating in parallel with each other and in cooperation with said processor for interpreting and executing said commands.

* * * * *